United States Patent
Rice

Patent Number: 5,167,258
Date of Patent: Dec. 1, 1992

[54] RE-LINING OF SEWERS

[76] Inventor: Nigel Rice, Epworth Grange, Beltoft, Doncaster DN9 1JD, United Kingdom

[21] Appl. No.: 487,969
[22] PCT Filed: Nov. 4, 1988
[86] PCT No.: PCT/GB88/00939
§ 371 Date: May 30, 1990
§ 102(e) Date: May 30, 1990
[87] PCT Pub. No.: WO89/04435
PCT Pub. Date: May 18, 1989

[30] Foreign Application Priority Data
Nov. 6, 1987 [GB] United Kingdom ............... 8726073

[51] Int. Cl.⁵ .................... F16L 55/18; F16L 9/22
[52] U.S. Cl. .................................. 138/98; 138/97; 264/269; 405/154
[58] Field of Search ............ 138/97, 98; 405/150, 405/154; 264/36, 269; 156/187

[56] References Cited

U.S. PATENT DOCUMENTS

| | | | |
|---|---|---|---|
| 2,789,934 | 4/1957 | Busbach | 264/269 |
| 3,509,725 | 5/1970 | Schnabel | 405/150 |
| 3,788,087 | 1/1974 | Paten | 405/150 |
| 3,950,461 | 4/1976 | Levens | 138/97 |
| 4,170,248 | 10/1979 | Bennett et al. | |
| 4,421,698 | 12/1983 | Vanderlons | 264/269 |
| 4,724,108 | 2/1988 | Jupgenlohmann et al. | 138/98 |
| 4,728,223 | 3/1988 | Rice | 405/154 |
| 4,889,449 | 12/1989 | Lee | 138/98 |
| 4,954,016 | 9/1990 | Storgard | 405/154 |

FOREIGN PATENT DOCUMENTS

| | | |
|---|---|---|
| 0213674 | 3/1987 | European Pat. Off. |
| 2041147 | 9/1980 | United Kingdom |
| 2082285 | 3/1982 | United Kingdom |
| 2157797 | 10/1985 | United Kingdom |
| 2172957 | 10/1986 | United Kingdom |

*Primary Examiner*—James E. Bryant, III
*Attorney, Agent, or Firm*—Wegner, Cantor, Mueller & Player

[57] ABSTRACT

A sewer (1) is relined by introducing a flexible tubular waterproof membrane (4) and then inserting a pipe or pipe length (5)(5a)(5b) into the tubular membrane (4). Grout (10) is then introduced between the sewer (1) and the membrane (4). A further membrane (7) may be provided so that the grout (10) is located between the two membranes (4,7). In the case where the sewer (1) includes an opening for a lateral connection (11), the grout (10) extending across the opening can be removed. Alternatively the grout (10) can be prevented from extending across the opening. Another tubular membrane (8) may be located within the pipe lengths (5)(5a)(5b) to be filled with water during the introduction of the grout.

4 Claims, 2 Drawing Sheets

RE-LINING OF SEWERS

This invention relates to the renovation of existing sewers or like underground pipes.

BACKGROUND OF THE INVENTION

1. Field of the Invention

It is known to renovate sewers by relining them. The functions of the liner are fourfold namely to provide structural support, to provide a water tight seal (to prevent the infiltration and ex-filtration of liquids and also the ingress of tree roots), to provide chemical and corrosion resistance, and to afford a smooth hydraulic flow contents.

2. Description of the Related Art

It is known to re-line an existing sewer by introducing into the sewer a pipe of lesser diameter than the sewer so that the outer surface of the pipe lies adjacent to the inner surface of the wall of the existing sewer. Pipes of plastics material are particularly suitable for this purpose. They fulfil the above four functions and lengths of such pipe can be readily pushed, or drawn along the sewer. After the pipe has been inserted into the sewer, the annulus between the inner surface of the wall of the existing sewer and the outer surface of the pipe is ordinarily filled with grout in a process known as slip-lining.

A widely practiced method is to use lengths of pipe manufactured from polyethylene which are butt-welded to form a continuous pipeline which is then drawn into the existing sewer. However, although existing pipes for this purpose normally have a certain degree of resilience, this is not sufficient to allow very substantial bending of the pipe simultaneously with generally longitudinal movement. Thus it is necessary to excavate a trench at least at one end of the sewer run, to enable the pipe to be manipulated and fed into the sewer generally parallel to the axis thereof. Depending upon the depth of the sewer, this trench may have to be of such a length as to cause considerable disruption to traffic and other services.

With a view to avoiding this problem, it is also known to use shorter lengths of rigid pipe which can be inserted into the existing sewer via existing man-holes. This requires the shorter lengths of pipe to be joined together and various techniques have been devised for doing this including the use of screw threads and the use of co-operating spigots and sockets. However, in these cases, the thickness of the pipe wall usually has to be increased in order to accommodate the joint and this increases cost.

In my British Patent No. 2 157 797, I have devised a method of providing sewers with a liner which will satisfy the above four requirements which involves feeding a length of a first plastics pipe into the existing sewer via a man-hole shaft, which pipe has a corrugated wall which enables it to be resiliently deformed in order to enable it to pass from the man-hole shaft into the existing sewer. Then a length of a second plastics pipe is fed into the first pipe. The second pipe has a smooth internal surface and provides rigidity to the composite liner formed by the two pipes. Since waterproofing is already provided by the first pipe, the second pipe can be introduced as a succession of short pipe elements which do not need to be joined together.

It is an object of the present invention to provide an alternative method of relining existing sewers which similarly satisfies the above mentioned four requirements and does not require significant trench excavation to allow entry of the materials used for the relining.

SUMMARY OF THE INVENTION

Accordingly, the present invention provides a method of relining an existing sewer or like underground pipe, which comprises the steps of (i) introducing a flexible tubular waterproof membrane into the sewer or the like, (ii) introducing a pipe into the tubular membrane, and (iii) introducing grout between the existing sewer or the like and the membrane.

The flexible membrane may, for example, be formed of polyethylene film extruded as a tube (e.g. lay flat tubing) and can be readily drawn up the sewer from existing man-holes. The pipe introduced into the tubular membrane is ideally formed of plastics material having a high modulus such as glass fibre resin reinforced plastics (GRP) or unplasticised polyvinyl chloride (PVC) and is preferably of a length such as to allow access to the existing sewer via the man-hole without excavation. The ends of the pipe lengths may be left square where the line of the existing sewer is reasonably straight. In the case where the line of the existing sewer is not straight, the ends of the pipe lengths may be preformed with internal and external chamfers. The pipe lengths do not need to be joined together since the waterproofing requirement is fulfilled by the tubular membrane. Ordinarily, however, the pipe lengths will maintain a good butting relationship with respect to one another as a consequence of the presence of the tubular membrane which will tend to restrict misalignment of the pipe lengths. The pipe lengths may be taken up the existing sewer either individually or as a string of pipes joined together and the tubular membrane may be inflated with air in order to assist passage of the pipe lengths through the membrane.

The grouts commonly used for filling the annular space between the pipe and the existing sewer wall are ordinarily formed of cementitious materials. Ordinarily, the pipe would tend to float on the grout during the grouting process and, in order to prevent this and ensure that the grout is evenly distributed around the periphery of the annulus, the pipe will ordinarily be weighted. This is achieved, in accordance with a particularly preferred embodiment, by inserting another flexible tubular waterproof membrane into the pipe prior to grouting. This tubular membrane is then sealed at one end and filled with water to reduce the buoyancy of the pipe when the grout is introduced. The pipe lengths prevent this tubular membrane from rupturing when it is filled with water since they provide support to the same.

In some cases, water may infiltrate from the surrounding grounds, into the annulus and, in order to displace any such water from the annulus, the specific gravity of the grout should be greater than 1 and normally greater than 1.1. When grouts of this type are used, the problem of flotation of the pipe is more pronounced and it is then necessary either to provide additional weights, by means of chains or the like, to prevent flotation of the pipe or to introduce the grout in stages and allow the grout of each stage to set before introducing the grout of the next stage. Alternatively, this problem can be overcome in accordance with a further embodiment, by inserting two flexible tubular membranes into the existing sewer prior to the introduction of the pipe. Then the grout is introduced between these two membranes. In this case, grouts having densities of less than 1 may be used. Further since the grout is between the two membranes, it is shielded from contact with any ground water which may enter the existing sewer under pressure (infiltration) and mix into the grout before it sets (and thereby reduce the final strength) or, if chemically agressive, have an adverse reaction on the grout. Moreover, non-joined pipe lengths instead of lengths joined together to form continuous pipe can be used since the inner of the two membranes provides the required water tight seal. This is particularly useful in the case where non-circular section pipe lengths are used which are particularly difficult to join together.

This embodiment is also of advantage in the case where the existing sewer includes lateral connections to other sewers.

In this case, for example, pipelengths may be inserted into the inner of the two tubular waterproof membranes, until the trailing edge of the last pipe length is just beyond the lateral connection. Then a closed circuit television camera mounted within a measuring cage can be passed up the sewer until it abuts against the trailing edge of the last pipe length which serves as a datum point. By means of the camera, the operator on the surface can obtain an accurate indication of the size of the lateral opening and its location with respect to the last pipe length. Thus, the next pipe length can be appropriately cut, on the surface, so that it has an aperture which, when the pipe length is introduced into the sewer so that its leading edge is adjacent to the previous pipe length, is in registry with the lateral opening. After removal of the camera, a further tubular waterproof membrane can be introduced inside the pipe lengths and filled with water to reduce the buoyancy. The grout is then introduced between the two membranes positioned between the sewer wall and the pipe lengths, the inner of the membranes preventing the grout from entering the pipe lengths via the aperture and the outer of the membranes preventing the grout entering the lateral either directly via the lateral opening or indirectly via fissures in the ground and fractures in the lateral connection. After the grout has set and the water has been drained off, the camera may be re-inserted into the pipe. In the case where the inner of the two membranes is transparent, the grout extending across the lateral opening will be readily visible in the camera and the operator can then cut through the two membranes and the grout to provide access to the lateral connection.

In a modification of the above embodiment, the water introduced into the tubular membrane within the pipe lengths is pressurised so that the membrane within the pipe is distended outwardly through the aperture in the pipe length so as to squeeze together the tubular membranes between the existing sewer and the pipe lengths in the vicinity of the lateral opening and urge them against the rim of the lateral opening. In this case the grout cannot flow between the two tubular membranes and hence it does not extend across the lateral opening. Thus, after the grout has set, it is merely necessary to cut through the two tubular membranes in the vicinity of the lateral connection in order to provide access to the lateral connection.

BRIEF DESCRIPTION OF THE DRAWINGS

For a better understanding of the invention and to show how the same may be carried into effect, reference will now be made, by way of example, to the accompanying drawings, in which.

In the Figures, the drawings are not to scale, and dimensions have been exaggerated to facilitate a clearer understanding of the invention.

DESCRIPTION OF PREFERRED EMBODIMENTS

Figure 1:
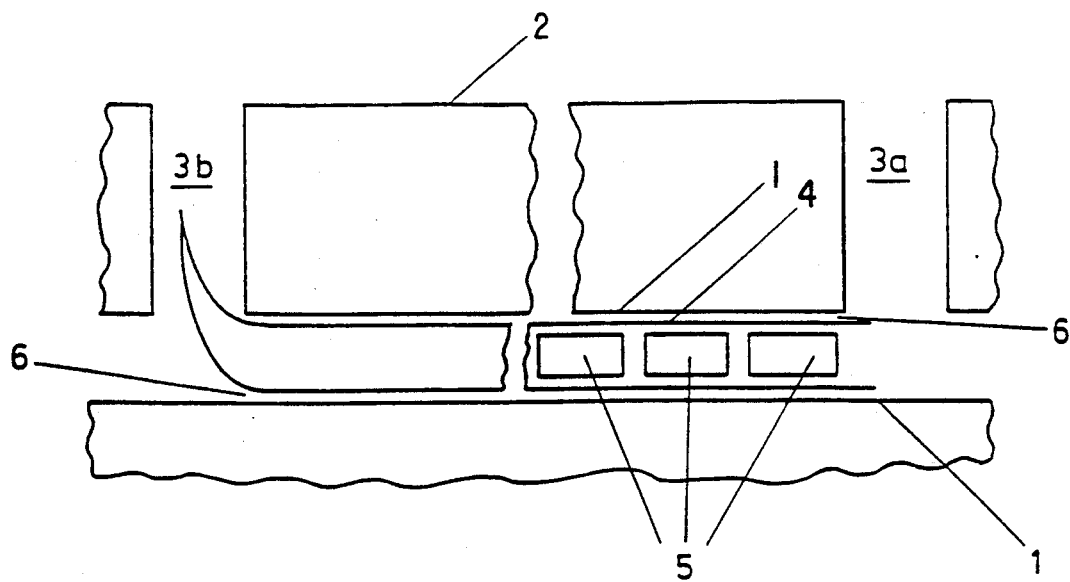
FIG. 1 is a schematic illustration of a first stage in the relining of a sewer in accordance with the present invention.

Referring to FIG. 1, an existing sewer which is deteriorating and in need of relining is indicated by reference numeral 1. The sewer is buried in a trench below the ground surface 2 and access to the sewer is provided by a number of upwardly extending man-hole shafts 3a and 3b. Ordinarily, each man-hole shaft will have a removable metal cover (not shown) which fits over the entrance opening of the shaft.

In accordance with the invention, a first tubular membrane 4 formed by extruding polyethylene as lay flat tubing is drawn through the sewer 1 from first man-hole shaft 3a to second man-hole shaft 3b. Then, the tubular membrane 4 is inflated with air so that it lies against the inner surface of the existing sewer 1. Lengths 5 of rigid pipe formed of plastics material such as unplasticised PVC or GRP are then pushed up the sewer inside the tubular membrane 4. Adjacent lengths are in butting relationship but are not connected together since the tubular membrane 4 provides the necessary waterproofing. Thereafter, after the lengths 5 have been suitably weighted as necessary, cementitious grout is introduced into the annulus 6 between the outer surface of the tubular membrane 4 and the inner surface of the existing wall of the sewer 1. The pipe lengths 5 provide structural support to the tubular membrane 4 and have a smooth inner surface which facilitates the hydraulic flow of the contents passing through the sewer. Both the pipe lengths 5 and the membrane 4 are formed of materials which have the required chemical and corrosion resistance.

Figure 2:
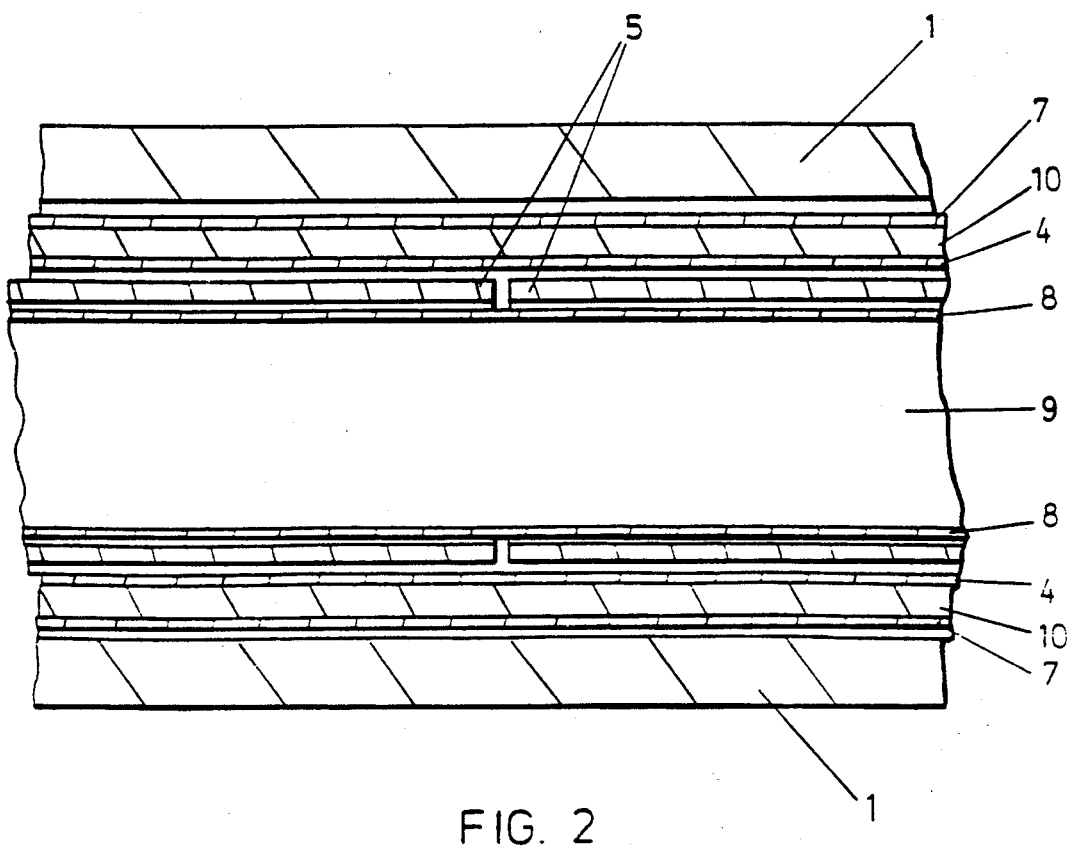
FIG. 2 shows a sewer which has been renovated in accordance with one embodiment of the present invention.

Referring now to FIG. 2, there is illustrated a renovated sewer in accordance with a further embodiment of the present invention. In this Figure, parts corresponding to parts of FIG. 1 are denoted by like reference numerals. In this case, two tubular membranes of polyethylene are passed up the existing sewer 1 to provide inner membrane 4 and outer membrane 7. As before, air can be introduced into the interior of the inner membrane 4 so as to urge the membranes against the inner wall of the existing sewer 1. Lengths 5 of pipe (formed of for example unplasticised PVC or GRP) are then introduced up the interior of the inner membrane 4 as described with reference to FIG. 1. Thereafter a further tubular membrane 8 formed of polyethylene is introduced into the interior of the assembled lengths 5 of pipe and filled with water 9 to reduce the tendency of the assembly to float on the introduction of the grout. Cementitous grout 10 is then introduced between the inner membrane 4 and outer membrane 7 to fill the annulus between the pipe and the existing sewer and allowed to set. Thereafter, the water 9 is drained off.

In this embodiment, the inner membrane 4 prevents the contents of the sewer from ex-filtrating out of the sewer and the outer membrane 7 prevents ground water from entering the sewer and mixing with the grout before it has set or attacking the grout when it has set. The lengths 5 of pipe provide support to the composite and afford a smooth hydraulic flow to the contents of the sewer.

Figure 3:
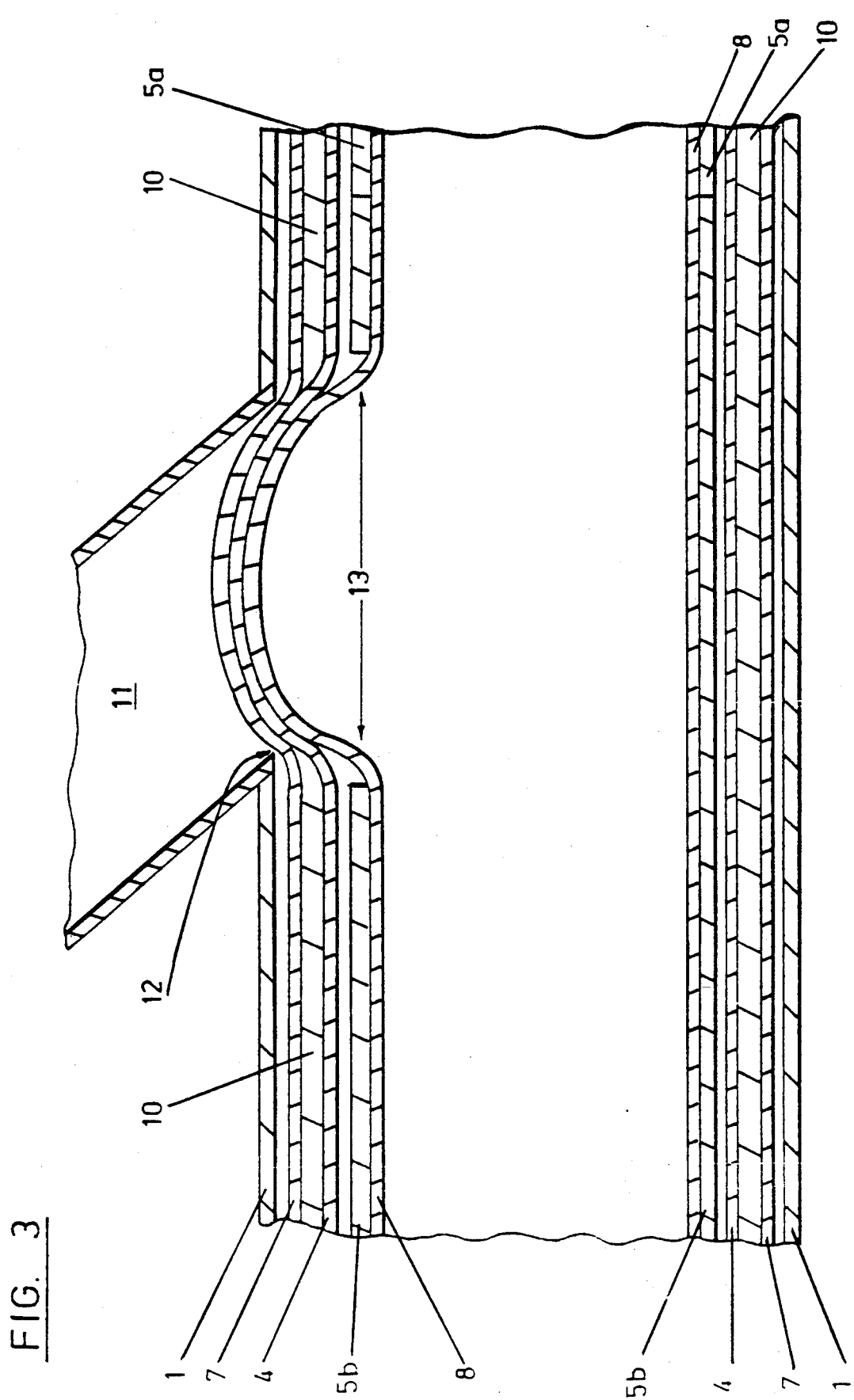
FIG. 3 shows a sewer with a lateral connection renovated in accordance with another embodiment of the present invention.

Referring now to FIG. 3, parts corresponding to parts of FIGS. 1 and 2 are denoted by like reference numerals.

In this embodiment, the sewer 1 includes an opening in its wall for a lateral connection 11 inclined at 45°. In the manner previously described inner and outer tubular membranes 4 and 7 are introduced into the existing sewer 1. Lengths of pipe (formed of, for example, PVC or GRP) are then passed up into the interior of the inner membrane 4 until the trailing edge of the last pipe length 5a is just beyond the opening for the lateral connection 11. A closed circuit television camera is then inserted into the sewer 1 until it abuts against the trailing edge and is used to obtain an accurate indication of the size and location of the opening. Then the wall of the next pipe length 5b is provided with an aperture 13 of a corresponding size and location such that, when the pipe length 5b is introduced into the sewer 1 in abutting relationship with pipe length 5a, the aperture 13 is in registry with the opening for the lateral connection. Thereafter the tubular membrane 8 is inserted inside the pipe lengths and water is introduced into the membrane 8 under pressure. The membrane 8 is distorted outwardly by the water pressure and extends through the aperture 13 in pipe length 5b to squeeze the membranes 4 and 7 together in the vicinity of the opening for the lateral connection and urge them into contact with the rim 12 of the opening. When the grout 10 is introduced it cannot penetrate between the membranes 4 and 7 in the vicinity of the opening for the lateral connection where they are squeezed together. Thus, after the grout has set and the membrane 8 has been removed, it is merely necessary to cut through the membranes 4 and 7 adjacent the rim 12 for the lateral connection 11 and the relined sewer 1 to be placed in communication. Preferably, the membranes 4 and/or 7 are secured to the rim 12 to protect the edge of the grout.

Although the invention has been described in relation to the use of discrete lengths of pipe, it will be appreciated that the invention is equally applicable to the case where the pipe is formed of, for example, helically wound pipe since it facilitates the use of low density grouting materials.

I claim:

1. A method of relining an underground pipe having a pipe opening for a lateral connection, comprising:
   introducing a first flexible, waterproof tubular membrane into an underground pipe, said first tubular membrane having an inner surface and an outer surface;
   introducing a second flexible, waterproof tubular membrane into the underground pipe, the second tubular membrane having an inner surface and an outer surface, wherein the inner surface of the second tubular membrane surrounds the outer surface of the first tubular membrane;
   inserting in succession into the inner surface of the first tubular membrane a plurality of pipe lengths each having a leading edge and a trailing edge until the trailing edge of the last of said plurality of pipe lengths is beyond the pipe opening;
   cutting an aperture in an additional pipe length, said additional pipe length having a leading edge and a trailing edge, wherein said aperture is cut to register with the pipe opening when the additional pipe is inserted so that the leading edge of the additional pipe is adjacent the trailing edge of the last of said plurality of pipe lengths;
   inserting said additional pipe length inside the inner surface of the first tubular membrane so that the aperture registers with the pipe opening;
   introducing grout between the outer surface of the first tubular membrane and the inner surface of the second tubular membrane;
   allowing the grout to set; and
   removing a portion of the first and second membranes and the grout underlying the pipe opening to allow fluid communication between the lateral connection and the underground pipe.

2. A method according to claim 1, wherein the first tubular membrane and the second tubular membrane are formed of polyethylene and the pipe lengths are formed of glass fiber reinforced plastic or unplasticized polyvinyl chloride.

3. A method of relining an underground pipe having a pipe opening for a lateral connection, comprising:
   introducing a first flexible, waterproof tubular membrane into an underground pipe, said first tubular membrane having an inner surface and an outer surface;
   introducing a second flexible, waterproof tubular membrane into the underground pipe, the second tubular membrane having an inner surface and an outer surface, wherein the inner surface of the second tubular membrane surrounds the outer surface of the first tubular membrane;
   inserting in succession into the inner surface of the first tubular membrane a plurality of pipe lengths each having a leading edge and a trailing edge until the trailing edge of the last of said plurality of pipe lengths is beyond the pipe opening;
   cutting an aperture in an additional pipe length, said additional pipe length having a leading edge and a trailing edge, wherein said aperture is cut to register with the pipe opening when the additional pipe is inserted so that the leading edge of the additional pipe is adjacent the trailing edge of the last of said plurality of pipe lengths;
   inserting said additional pipe length inside the inner surface of the first tubular membrane so that the aperture registers with the pipe opening;
   inserting a third flexible, waterproof tubular membrane inside the pipe lengths;
   introducing water under pressure into the third tubular membrane so that the third tubular membrane distends through the aperture to squeeze the first and second membranes together and prevent grout from penetrating between the first and second membranes near the pipe opening;
   introducing grout between the underground pipe and the outer surface of the first tubular membrane;
   allowing the grout to set;
   removing the third tubular membrane from the underground pipe; and
   removing a portion of the first and second membranes underlying the pipe opening to allow a fluid communication between the lateral connection and the underground pipe.

4. A method according to claim 3, wherein the first tubular membrane and the second tubular membrane are formed of polyethylene and the pipe lengths are formed of glass fiber reinforced plastic or unplasticized polyvinyl chloride.

* * * * *